United States Patent [19]

Frame

[11] 4,159,964

[45] Jul. 3, 1979

[54] METAL CHELATE CATALYST AND ALKANOLAMINE HYDROXIDE ON ADSORPTIVE SUPPORT

[75] Inventor: Robert R. Frame, Glenview, Ill.

[73] Assignee: UOP Inc., Des Plaines, Ill.

[21] Appl. No.: 928,925

[22] Filed: Jul. 28, 1978

Related U.S. Application Data

[63] Continuation-in-part of Ser. No. 868,600, Jan. 11, 1978, Pat. No. 4,124,494.

[51] Int. Cl.² ............................ B01J 31/12; B01J 31/02
[52] U.S. Cl. .............................. 252/428; 252/431 N; 208/207
[58] Field of Search ................... 252/428, 431 N, 207, 252/206

[56] References Cited

U.S. PATENT DOCUMENTS

| | | | |
|---|---|---|---|
| 2,744,854 | 5/1956 | Urban, Jr. | 208/206 |
| 2,978,404 | 4/1961 | Bowers | 208/207 |
| 4,003,827 | 1/1977 | Carlson et al. | 208/206 |
| 4,028,269 | 6/1977 | Carlson et al. | 252/428 |
| 4,033,860 | 7/1977 | Carlson et al. | 208/206 |
| 4,070,271 | 1/1978 | Carlson et al. | 208/206 |
| 4,121,997 | 10/1978 | Frame | 208/206 |
| 4,124,494 | 11/1978 | Frame | 208/207 |

*Primary Examiner*—George Crasanakis
*Attorney, Agent, or Firm*—James R. Hoatson, Jr.; Robert W. Welch; William H. Page, II

[57] ABSTRACT

A catalytic composite comprising a metal chelate mercaptan oxidation catalyst and an alkanolamine hydroxide impregnated on a solid adsorptive support is disclosed.

12 Claims, No Drawings

METAL CHELATE CATALYST AND ALKANOLAMINE HYDROXIDE ON ADSORPTIVE SUPPORT

CROSS-REFERENCE TO RELATED APPLICATIONS

This application is a continuation-in-part of a copending application Ser. No. 868,600 filed Jan. 11, 1978 which issued as U.S. Pat. No. 4,124,494.

This invention relates to a catalytic composite particularly adapted to the conversion of difficultly oxidizable mercaptans contained in a sour petroleum distillate. Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. Depending on the source of the petroleum from which the sour petroleum distillate was derived, the boiling range of the distillate itself, and possibly the method of processing the petroleum to produce the distillate, the distillates vary widely with respect to the concentration, molecular weight and complexity of the mercaptans contained therein, and the sweetening process will vary accordingly.

One such process relates to olefin-containing petroleum distillates. When said distillates are required to be maintained in storage for any length of time, they advantageously contain an oxidation inhibitor to obviate gum formation. The inhibitor is typically an oil-soluble phenylenediamine. When the olefin-containing distillates further contain a relatively small concentration of the more readily oxidizable mercaptans, the phenylenediamine acts as a homogenous oxygen transfer agent, and, in the presence of an alkaline reagent, promotes the oxidation of mercaptans and the formation of disulfides. It is to be noted that at least one-third of the mercaptans are consumed by interaction with the olefin-content of the sour distillates. The process is commonly referred to as inhibitor sweetening. The homogenous phenylenediamine is not recoverable but is expended in the sweetening process, and as the amount of the phenylenediamine required to effect an economical rate of oxidation becomes excessive, the process becomes ineffective as a sweetening process and resort must be had to other means. It is known that inhibitor sweetening which is essentially a batch type of process more suited to the treatment of sour distillates in storage, functions only with respect to olefin-containing distillates—the olefin being essential to the inhibitor sweetening process. Over a period of time, usually measured in hours or days, the stored distillate may become doctor sweet depending on the complexity and concentration of the mercaptans contained therein. While certain quaternary ammonium compounds have been used in conjunction with the homogenous phenylenediamine catalyst to accelerate the sweetening process as shown in U.S. Pat. No. 3,164,544, the process remains subject to the general limitations of inhibitor sweetening. Thus, inhibitor sweetening is generally ineffective with respect to sour petroleum distillates containing mercaptans other than primary and secondary mercaptans, and increasingly ineffective with respect to petroleum distillates containing in excess of about 150 ppm. mercaptan sulfur.

Sour petroleum distillates that do not respond to inhibitor sweetening, i.e., those containing the higher molecular weight and/or more complex mercaptans, or higher mercaptan concentrations, are commonly treated in contact with a heterogenous metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. This liquid-liquid system is invariably employed in a continuous type of operation requiring a substantially lesser contact time than required of inhibitor sweetening. The metal phthalocyanine catalyst, which is recovered and recycled for continuous use, is not limited to use in conjunction with an olefin-containing petroleum distillate, but is equally effective with regard to olefin-free distillates to provide a doctor sweet product.

Certain of the higher boiling sour petroleum distillates, generally boiling in excess of about 275° F., contain highly hindered branched chain and aromatic thiols, and/or higher molecular weight tertiary and polyfunctional mercaptans, which are at most only partially soluble in the catalyst-containing caustic solution of the liquid-liquid treating system. Sour petroleum distillates containing these more difficultly oxidizable mercaptans are more effectively treated in contact with a metal phthalocyanine catalyst disposed or impregnated on a high surface area adsorptive support or carrier material—usually an activated charcoal. The distillate is treated in contact with the supported metal phthalocyanine catalyst at oxidation conditions in the presence of an alkaline reagent. One such process is described in U.S. Pat. No. 2,988,500. The oxidizing agent is most often air admixed with the distillate to be treated, and the alkaline reagent is most often an aqueous caustic solution charged continuously to the process or intermittently as required to maintain the catalyst in a caustic wetted state.

It is an object of this invention to present a novel catalytic composite particularly useful in the treatment of sour petroleum distillates containing the more difficultly oxidizable mercaptans.

In one of its broad aspects, the present invention embodies a catalytic composite comprising a metal chelate mercaptan oxidation catalyst and an alkanolamine hydroxide impregnated on a solid adsorptive support, said alkanolamine hydroxide being represented by the structural formula

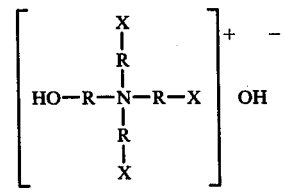

wherein R is an alkylene radical containing up to about 3 carbon atoms and X is a hydroxyl radical or hydrogen.

One of the more specific embodiments concerns a catalytic composite comprising from about 1 to about 10 wt.% metal phthalocyanine and from about 1 to about 50 wt.% ethanoltrimethylammonium hydroxide impregnated on an activated charcoal support.

A still more specific embodiment of this invention relates to a catalytic composite comprising from about 1 to about 2 wt.% cobalt phthalocyanine monosulfonate and from about 5 to about 35 wt.% ethanoltrimethylammonium hydroxide impregnated on an activated charcoal support.

Other objects and embodiments of this invention will become apparent in the following detailed specification.

The metal chelate mercaptan oxidation catalyst employed as a component of the catalytic composite of this invention can be any of the various metal chelates known to the treating art as effective to catalyze the oxidation of mercaptans contained in a sour petroleum distillate with the formation of polysulfide oxidation products. Said chelates include the metal compounds of tetrapyridinoporphyrazine described in U.S. Pat. No. 3,980,582, e.g., cobalt tetrapyridinoporphyrazine; porphyrin and metal porphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts as described in U.S. Pat. No. 2,918,426, e.g., the condensation product of an aminophenol and a metal of Group VIII; and the like. Metal phthalocyanines are a preferred class of metal chelate mercaptan oxidation catalysts.

The metal phthalocyanines employed as a mercaptan oxidation catalyst generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like.

Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate, or a mixture thereof, being particularly preferred. The sulfonated derivatives may be prepared, for example, by reacting cobalt, vanadium or other metal phthalocyanines with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The alkanolamine hydroxide component of the catalytic composite of this invention is represented by the structural formula

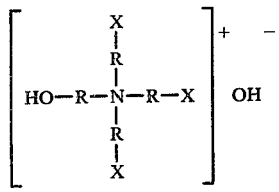

wherein R is an alkylene radical containing up to about 3 carbon atoms and X is a hydroxyl radical or hydrogen. Suitable alkanolamine hydroxides thus include alkanoltrialkylammonium hydroxides, particularly ethanoltrialkylammonium hydroxides, like ethanoltrimethylammonium hydroxide, ethanoltriethylammonium hydroxide and ethanoltripropylammonium hydroxide, but also methanoltrimethylammonium hydroxide, methanoltriethylammonium hydroxide, methanoltripropylammonium hydroxide, propanoltrimethylammonium hydroxide, propanoltripropylammonium hydroxide, and the like. Other suitable alkanolamine hydroxides include dimethanoldimethylammonium hydroxide, dimethanoldiethylammonium hydroxide, dimethanoldipropylammonium hydroxide, trimethanolmethylammonium hydroxide, trimethanolethylammonium hydroxide, trimethanolpropylammonium hydroxide, diethanoldimethylammonium hydroxide, diethanoldiethylammonium hydroxide, diethanoldipropylammonium hydroxide, triethanolmethylammonium hydroxide, triethanolethylammonium hydroxide, triethanolpropylammonium hydroxide, tetraethanolammonium hydroxide, and the like. Ethanoltrimethylammonium hydroxide (choline) is a preferred alkanolamine hydroxide.

The solid adsorbent support or carrier material employed herein can be any of the well-known solid adsorbent materials generally utilized as a catalytic support or carrier material. Preferred adsorbent materials include the various charcoals produced by the destructive distillation of wood, peat, lignite, nutshells, bones and other carbonaceous matter, and preferably such charcoals as have been heat treated or chemically treated, or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate heretofore described, the solid adsorbent carrier material should be insoluble in, and otherwise inert to, the petroleum distillate at the alkaline reaction conditions existing in the treating zone. In the latter case, charcoal, and particularly activated charcoal, is preferred because of its capacity for metal phthalocyanine, and because of its stability under treating conditions.

The alkanolamine hydroxides of this invention, as well as the metal chelate mercaptan oxidation catalyst, particularly the metal phthalocyanines, are readily adsorbed on the solid adsorbent support. The alkanolamine hydroxide may comprise up to about 50 wt.% or more of the catalytic composite. In the sweetening process herein contemplated, the alkanolamine hydroxide will suitably comprise from about 1 to about 50 wt.%, and preferably from about 5 to about 35 wt.% of said composite. In general, up to about 25 wt.% metal phthalocyanine can be adsorbed on the solid adsorbent support and still form a stable catalytic composite. A lesser amount in the range of from about 0.1 to about 10 wt.% generally forms a suitably active catalytic composite. The activity advantage derived from metal phthalocyanine concentrations in excess of about 2 wt.% has not heretofore warranted use of higher concentrations. However, in view of the significant increase in activity derived from the use of the alkanolamine hydroxide of this invention in conjunction with minimal metal phthalocyanine concentrations, it is contemplated that the higher concentrations will become effective to promote a further increase in the rate of mercaptan oxidation, particularly with regard to the hard to treat sour petroleum distillates.

The alkanolamine hydroxide and the metal chelate components can be impregnated on the solid adsorbent support in any conventional or otherwise convenient manner, and said components can be impregnated on said support simultaneously from a common aqueous or alcoholic solution and/or dispersion thereof, or separately and in any desired sequence. The impregnation process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic impregnating solution and/or dispersion to adsorb a given quantity of the alkanolamine hydroxide and metal chelate components thereon. One preferred method involves the use of a steam-jacketed rotary dryer. The adsorbent support is immersed in the impregnating solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

An alternative and convenient method for adsorbing the alkanolamine hydroxide and metal chelate components on the solid adsorbent support comprises predisposing the support in a sour petroleum distillate treating zone or chamber as a fixed bed and passing the alkanolamine hydroxide—metal chelate impregnating solution and/or dispersion through the bed in order to form a catalytic composite in situ. This method allows the solution and/or dispersion to be recycled one or more times to achieve a desired concentration of the alkanolamine hydroxide and metal chelate components on the adsorbent support. In still another alternative method, the adsorbent may be predisposed in said treating zone or chamber, and the zone or chamber thereafter filled with the impregnation solution and/or dispersion to soak the support for a predetermined period.

In the process of sweetening a sour petroleum distillate, it has heretofore been the practice to oxidize the mercaptans contained therein in the presence of an alkaline reagent. With respect to the catalytic composite of this invention, those distillates containing the more readily oxidizable mercaptans can be treated in the absence of any added alkaline reagent. However, those sour petroleum distillates containing the more difficultly oxidizable mercaptans are more efficiently treated in contact with the catalytic composite of this invention in the presence of an alkaline reagent as heretofore practiced. A supported mercaptan oxidation catalyst is typically initially saturated with the alkaline reagent, and the alkaline reagent thereafter passed in contact with the catalyst bed, continuously or intermittently as required, admixed with the sour petroleum distillate. Any suitable alkaline reagent may be employed. An alkali metal hydroxide in aqueous solution, e.g., sodium hydroxide in aqueous solution, is most often employed. The solution may further comprise a solubilizer to promote mercaptan solubility, e.g., alcohol and especially methanol, ethanol, n-propanol, isopropanol, etc., and also phenols, cresols, and the like. A particularly preferred alkaline reagent is an aqueous caustic solution comprising from about 2 to about 30 wt.% sodium hydroxide. The solubilizer, when employed, is preferably methanol, and the alkaline solution may suitably comprise from about 2 to about 100 vol.% thereof. Sodium hydroxide and potassium hydroxide constitute the preferred alkaline reagents, others including lithium hydroxide, rubidium hydroxide and cesium hydroxide are also suitably employed.

The process of this invention can be effected in accordance with prior art treating conditions. The process is usually effected at ambient temperature conditions, although higher temperatures up to about 150° C. are suitably employed. Pressures of up to about 1000° psi. or more are operable, although atmospheric or substantially atmospheric pressures are entirely suitable. Contact times equivalent to a liquid hourly space velocity of from about 1 to about 100 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The sour petroleum distillates vary widely in composition depending on the source of the petroleum from which the distillate was derived, the boiling range of the distillate, and possibly the method of processing the petroleum to produce the distillate. The catalytic composite of this invention is particularly adapted to the treatment of petroleum distillates boiling in excess of about 135° C., e.g., kerosene, jet fuel, fuel oil, naphtha and the like. These higher boiling distillates generally contain the more difficultly oxidizable mercaptans, e.g., the highly hindered branched chain and aromatic thiols—especially the higher molecular weight tertiary and polyfunctional mercaptans.

As heretofore mentioned, the alkanolamine hydroxide and metal phthalocyanine components of the catalytic composite of this invention are readily adsorbed on the solid adsorbent support component thereof. Thus, any of the said alkanolamine hydroxide or metal phthalocyanine components which may in time be leached from the support and carried away in the reactant stream can be easily restored to the catalytic composite in situ by introducing either or both of said components to the sweetening process, e.g., in admixture with the alkaline reagent, to be adsorbed on the solid adsorbent support in the treating zone.

The following example is presented in illustration of one preferred embodiment of this invention and is not intended as an undue limitation on the generally broad scope of the invention as set out in the appended claims.

EXAMPLE

In the preparation of the catalytic composite of this invention in accordance with one preferred embodiment, an impregnating solution and/or dispersion is formulated by adding about 0.75 gms. of cobalt phthalocyanine monosulfonate and about 23.5 gms. of a 50% alcoholic solution of ethanoltrimethylammonium hydroxide to 250 ml. of deionized water in a rotary steam evaporator. About 250 cc of 10 × 30 mesh activated charcoal particles is immersed in the impregnating solution and tumbled therein for about 1 hour by the rotating motion of the evaporator. Steam is thereafter applied to the evaporator jacket and the impregnating solution is evaporated to dryness in contact with the tumbling charcoal particles over a one hour period.

I claim as my invention:

1. A catalytic composite comprising a metal chelate mercaptan oxidation catalyst and an alkanolamine hydroxide impregnated on a solid adsorptive support, said alkanolamine hydroxide being represented by the structural formula

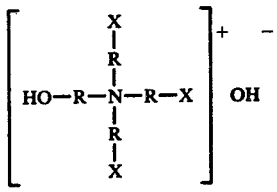

wherein R is an alkylene radical containing up to about 3 carbon atoms and X is a hydroxyl radical or hydrogen.

2. The catalytic composite of claim 1 further characterized in that said metal chelate mercaptan oxidation catalyst comprises from about 0.1 to about 10 wt.% of said catalytic composite.

3. The catalytic composite of claim 1 further characterized in that said metal chelate mercaptan oxidation catalyst comprises from about 0.1 to about 2.0 wt.% of said catalytic composite.

4. The catalytic composite of claim 1 further characterized in that said metal chelate mercaptan oxidation catalyst is a metal phthalocyanine.

5. The catalytic composite of claim 1 further characterized in that said metal chelate mercaptan oxidation catalyst is cobalt phthalocyanine.

6. The catalytic composite of claim 1 further characterized in that said metal chelate mercaptan oxidation catalyst is cobalt phthalocyanine monosulfonate.

7. The catalytic composite of claim 1 further characterized in that said alkanolamine hydroxide component comprises from about 1 to about 50 wt.% of said catalytic composite.

8. The catalytic composite of claim 1 further characterized in that said alkanolamine hydroxide component comprises from about 5 to about 35 wt.% of said catalytic composite.

9. The catalytic composite of claim 1 further characterized in that said alkanolamine hydroxide is an ethanoltrialkylammonium hydroxide.

10. The catalytic composite of claim 1 further characterized in that said alkanolamine hydroxide is an alkanoltrimethylammonium hydroxide.

11. The catalytic composite of claim 1 further characterized in that said alkanolamine hydroxide is ethanoltrimethylammonium hydroxide.

12. The catalytic composite of claim 1 further characterized in that said solid adsorptive support is an activated charcoal.

* * * * *